H. J. TRAVER.
SAW GUARD.
APPLICATION FILED MAR. 3, 1920.
1,370,072.
Patented Mar. 1, 1921.
4 SHEETS—SHEET 1.
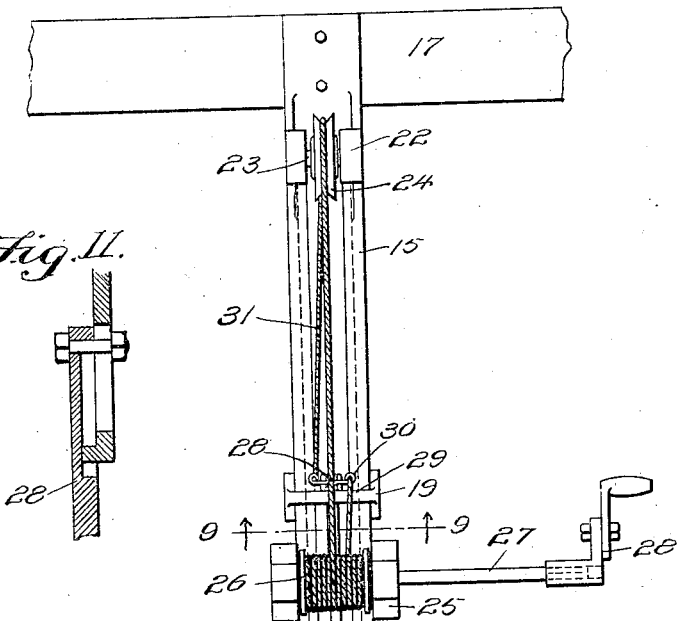
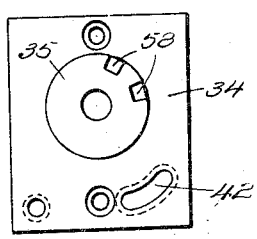
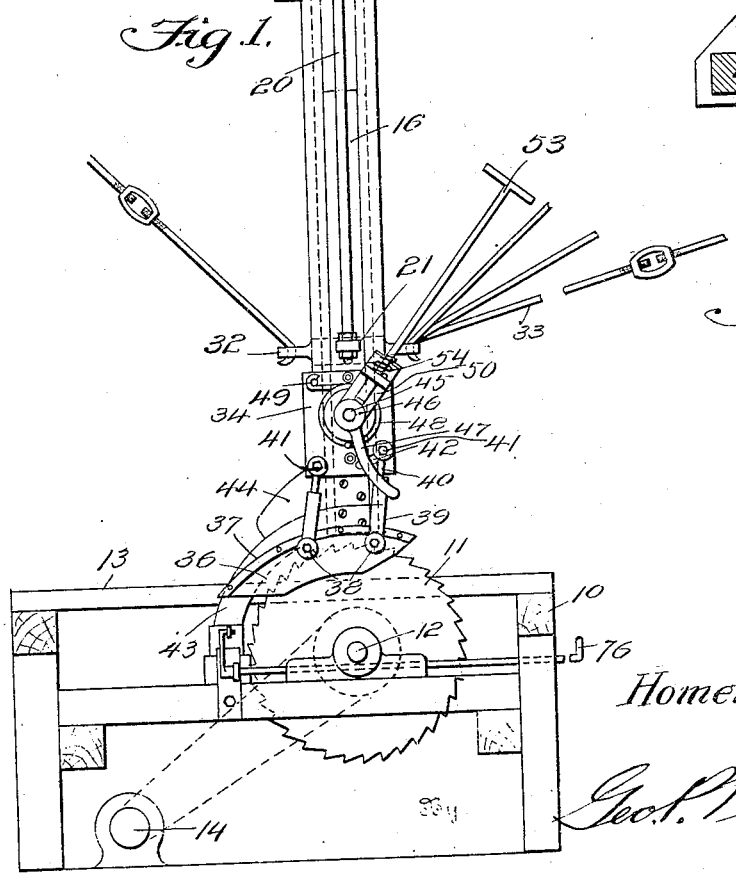
Inventor
Homer J. Traver,
By Geo. P. Kimmel
Attorney

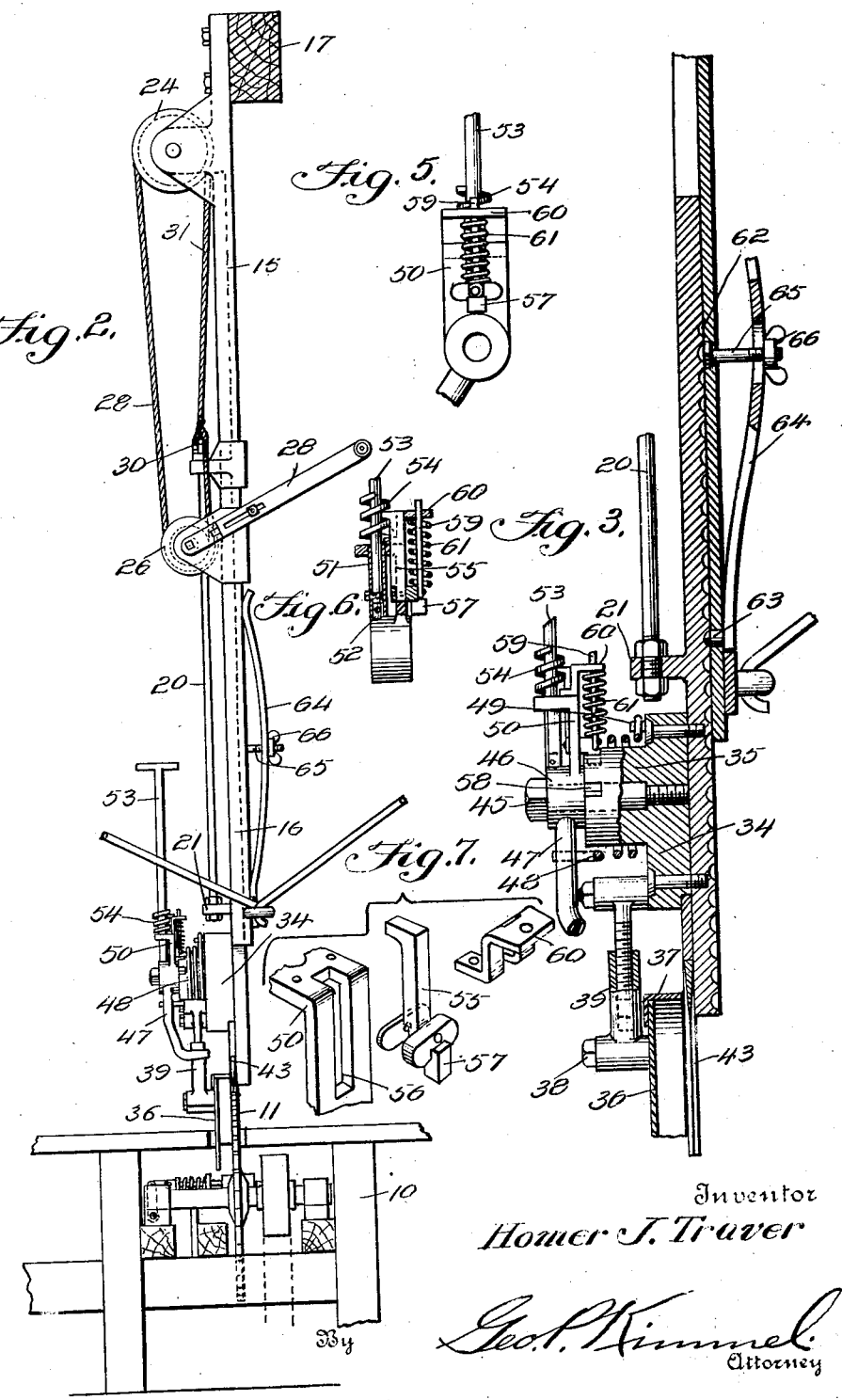

H. J. TRAVER.
SAW GUARD.
APPLICATION FILED MAR. 3, 1920.
1,370,072.
Patented Mar. 1, 1921.
4 SHEETS—SHEET 3.
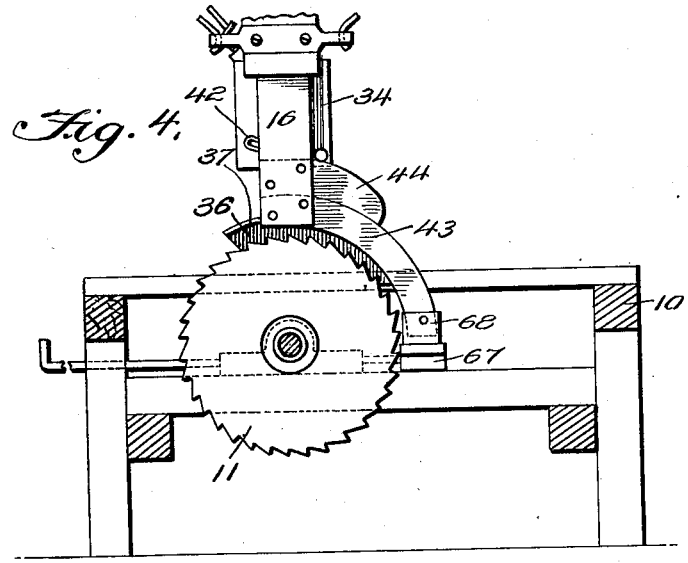
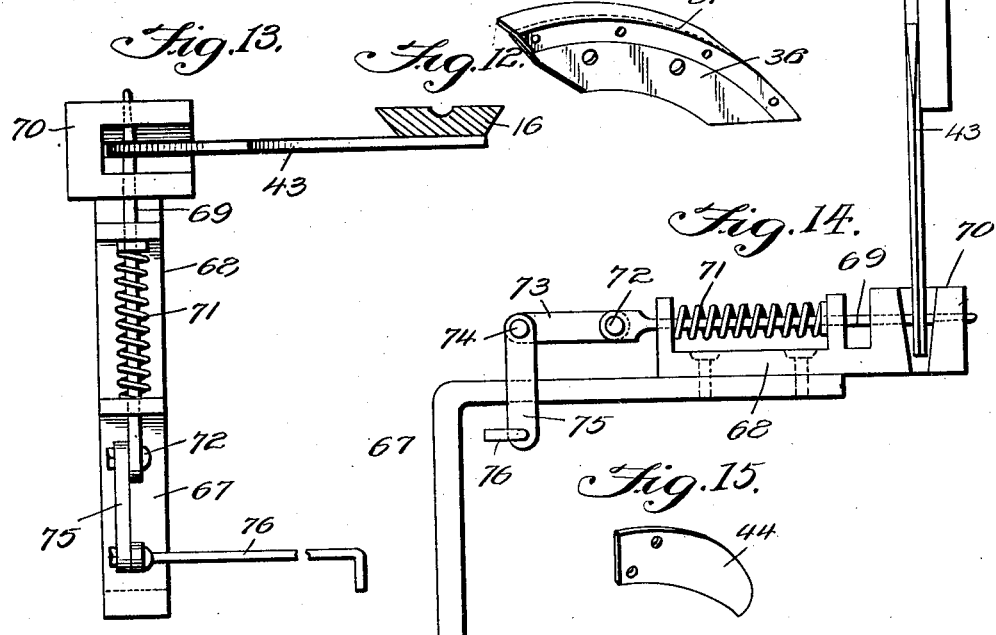
Inventor
Homer J. Traver
By Geo. T. Kimmel
Attorney

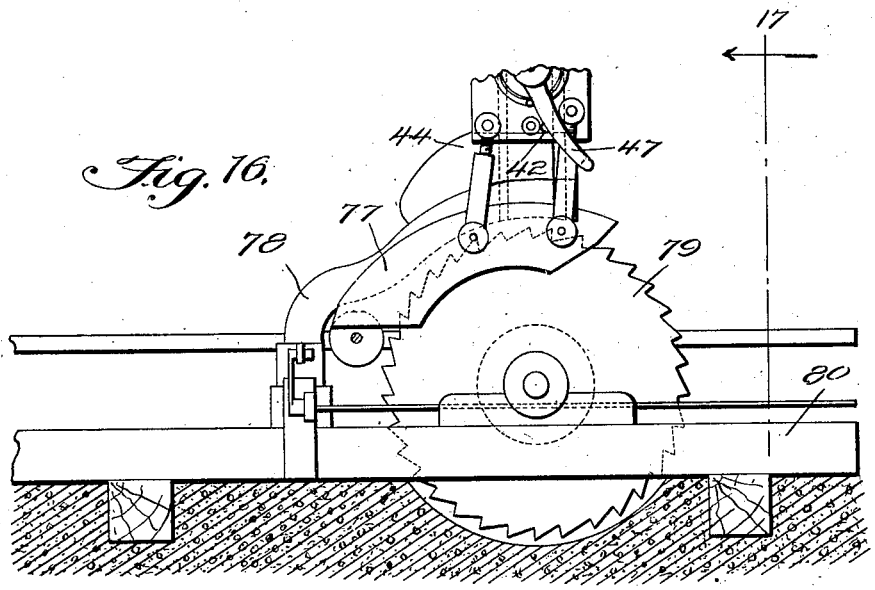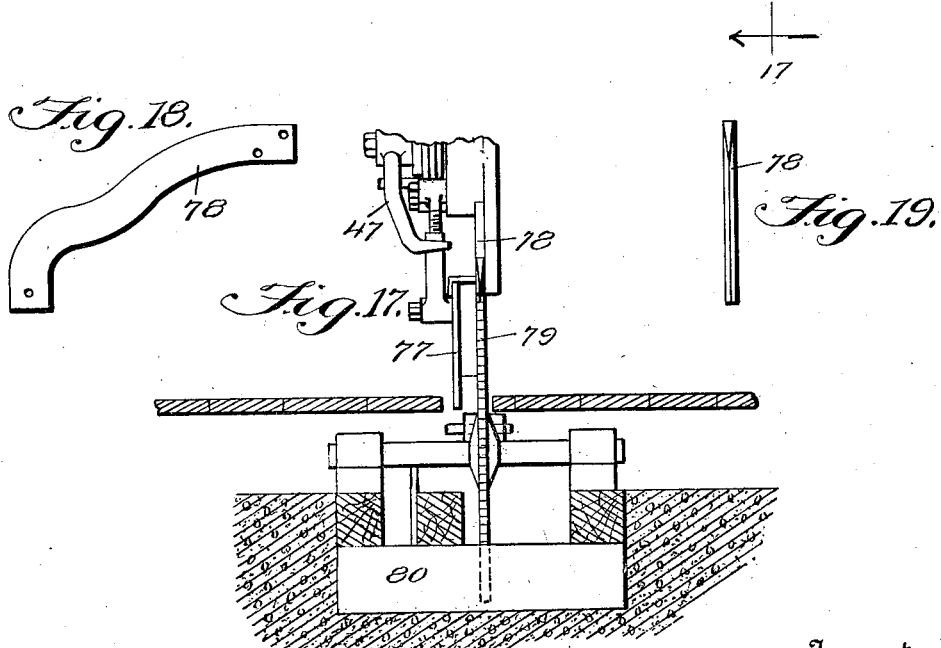

UNITED STATES PATENT OFFICE.

HOMER J. TRAVER, OF KERHONKSON, NEW YORK.

SAW-GUARD.

1,370,072. Specification of Letters Patent. Patented Mar. 1, 1921.

Application filed March 3, 1920. Serial No. 363,024.

*To all whom it may concern:*

Be it known that I, HOMER J. TRAVER, a citizen of the United States, residing at Kerhonkson, in the county of Ulster and State of New York, have invented certain new and useful Improvements in Saw-Guards, of which the following is a specification.

The invention relates to a saw guard and more particularly to the class of automatically and manually adjustable guards for circular saws.

The primary object of the invention is the provision of a guard of this character, wherein the saw is at all times protected and at the same time the hands of an operator are prevented from being caught by the saw during the time that the saw is being used upon the work or in feeding the work to be cut.

Another object of the invention is the provision of a guard of this character, wherein the side and back guard for the circular saw are mounted relative to each other and supported in a novel manner so that the same can be manually operated relative to the saw and the side guard is automatically shifted when the work to be cut is fed in the path of the saw so as to not interfere with the cutting operation of the latter, while the operator of the saw will be protected from injury during the cutting operation.

A further object of the invention is the provision of a guard of this character, wherein the back guard for the saw can be locked in position relative to said saw so as to be fixed in such position during the cutting operation, while the side guard is mounted so as not to interfere with the work when fed to the saw for the cutting thereof.

A still further object of the invention is the provision of a guard of this character, wherein the hanger for the side and back guard is of novel form to permit convenient vertical adjustment and to avoid undue strain upon the parts for adjusting the same.

With these and other objects in view, the invention consists in the features of construction, combination and arrangement of parts, as will be hereinafter fully described, illustrated in the accompanying drawings and pointed out in the claims hereunto appended.

In the accompanying drawings:

Figure 1 is a side elevation of a guard constructed in accordance with the invention, shown supported relative to a circular saw.

Fig. 2 is a front elevation.

Fig. 3 is a fragmentary vertical longitudinal sectional view through the lower portion of the hanger for the guard.

Fig. 4 is a fragmentary side elevation looking toward the side of the guard opposite to that shown in Fig. 1.

Fig. 5 is a fragmentary side elevation of the latch mechanism coöperating with the adjusting means for the guard.

Fig. 6 is an edge elevation of the latch mechanism shown in Fig. 5.

Fig. 7 is a view showing the adjunct parts of the latch mechanism separated from each other as assembled in Figs. 5 and 6 of the drawings.

Fig. 8 is a plan view of the stationary hub plate of the latch mechanism.

Fig. 9 is a view on the line 9—9 of Fig. 1 looking in the direction of the arrows.

Fig. 10 is a transverse sectional view through the lower section of the hanger for the guard.

Fig. 11 is a fragmentary vertical longitudinal sectional view through the operating handle or crank for the vertical adjustment of the guard.

Fig. 12 is a perspective view of the side guard.

Fig. 13 is a detail plan view of the locking device for the back guard.

Fig. 14 is a front elevation thereof.

Fig. 15 is a perspective view showing a section of the guard.

Fig. 16 is a fragmentary side elevation showing the guard arranged relative to a circular saw mount used for cutting timbers.

Fig. 17 is a sectional view on the line 17—17 of Fig. 16 looking in the direction of the arrows.

Fig. 18 is a side elevation of the guard.

Fig. 19 is an edge elevation thereof.

Similar characters of reference indicate corresponding parts throughout the several views in the drawings.

Referring to the drawings in detail 10 designates generally a portion of the bed frame of a bench saw, 11 the circular saw which has its supporting axle 12 journaled in the frame 10 and said saw works through a slot formed in a work table or support 13 in the customary manner, the table or support 13 being a part of the frame 10. The axle 12 of said saw 11 is driven through the medium of suitable connection with an electric motor 14 or other source of motive power. These parts may be of the standard or any other desired construction.

Referring now to the guard, the same comprises an upper vertically disposed stationary section 15 and a lower slidable section 16 of a hanger, the stationary section 15 being bolted or otherwise secured at its uppermost end to a roof rafter or joist 17, only a portion thereof being shown. The section 15 has in one face thereof a substantially dove-tailed shaped slot or guide channel 18, which extends longitudinally thereof and in which is slidably fitted the lower section 16, which is correspondingly shaped to the said slot or channel 18. Adjustably fitted on the upper section 15 is a guide bracket 19 in which is slidably fitted a lifting rod 20 which at its lower end is detachably secured to an eye 21 formed on the lower section 16 and on the raising and lowering of the rod 20 said section 16 can be correspondingly adjusted in the upper section 15 of the hanger.

Formed on the upper section 15 adjacent to the upper end thereof are spaced bearings 22 in which is journaled the spindle 23 of a guide pulley or wheel 24, while carried by said upper section 15 below the guide bracket 19 is a windless support 25 in which is carried a windlass 26, the shaft 27 therefor being extended in a forward direction from one side of the support 25 and has removably fitted on the free end thereof a two part adjustable crank handle 28 which is adapted to be manually turned for imparting movement to the windlass 26 which has trained about the same a winding and unwinding cable 28, one end 29 thereof being secured to a cross head 30 fixed to the upper end of the lifting rod 20, while the other end 31 of said cable is trained over the pulley 24 and is fastened to the cross head 30 so that on the rotation of the windlass 26 one end of the cable will be unwound therefrom and the other end wound thereon and in this manner the lifting rod 20 will be actuated for the adjustment of the lower section 16 of the hanger, which section is slidable in the upper section of said hanger as will be clearly apparent in Figs. 1, 2 and 3 of the drawings.

Formed on the section 15 of the hanger at the lower end portion thereof upon its front and rear edges are ears 32 in which are engaged truss rods 33 which are arranged angularly from different points of an inclosure so as to brace and steady the hanger from all sides thereof, it being understood of course that the truss rods 33 are connected in any suitable manner to the frame of the inclosure for the sawing machine.

Bolted or otherwise detachably secured upon the lower section 16 of the hanger spaced a distance from its lower end is the base plate 34 of a stationary hub 35 and adapted to be suspended from the lower portion of the base plate 34 over the saw 11 is the shiftable side guard including the side cheek 36 and crown 37, the latter being in the form of an angle bar curved correspondingly to the top edge of the side cheek 36 and bolted or otherwise fastened thereto. Mounted in the side cheek 36 of the side guard are spaced pivot bolts 38 on which are engaged the lower female members 39 of adjustable swinging couplers, the upper male members 40 of which are carried upon pivot bolts 41 mounted in the base plate 34, one of the bolts 41 being adjustably secured in an arcuate shaped slot 42 provided in said plate 34 to compensate for the swinging movement of the members 40 when the side guard is automatically shifted or manually moved. The members 40 are in adjustable threaded engagement with the female members 39, it being understood of course that either pair of pivot bolts 38 and 41 are removed to permit the adjustment of the male and female members 39 and 40 relative to each other. These adjustable couplers including the members 39 and 40 swingingly suspend the side guard relative to the saw 11, which guard is automatically shifted rearwardly when the piece of work is fed to the saw 11 and being cut thereby.

Bolted or otherwise fastened to the lower section 16 of the hanger immediately beneath the base plate 34 is the forward end of a rearwardly and downwardly curved back guard 43 which extends about approximately one quarter of the periphery of the saw 11 and this guard 43 is tapered in the direction of its forward edge or in a direction toward the periphery of the saw 11 so as to avoid jamming or crowding in the cut formed in the timber by the saw 11 when being cut thereby.

Superimposed relative to the guard 43 is an auxiliary or supplemental back guard 44 which is bolted or otherwise secured to the section 16 immediately above the point of connection of the back guard 43 therewith and this auxiliary or supplementary back guard 44 follows in the same path with the said back guard and is shown in detail in Fig. 15 of the drawings, while the said back guard 43 is shown in detail in Figs. 1 and 2 of the drawings.

Mounted centrally in the stationary hub 35 is a pivot bolt 45 on which is journaled a rotatable hub 46 formed with a curved tripping horn 47 which extends to engage the forward adjustable coupler suspending the side guard at its forward end over the saw 11, the horn 47 being acted upon by one end of a coiled tension spring 48 surrounding the stationary hub 35, the other end of the spring being fixed at 49 to the base plate 34 of said stationary hub and this spring 48 under its tension moves the tripping arm 47 in a forward direction. The rotatable hub 46 has formed thereon a bracket 50 in which is fitted a sleeve 51 the same being telescoped over and fastened to a lug 52 formed on said hub 46 and swiveled in this sleeve 51 is the inner end of a rotatable handle bar 53, the same being formed with a worm screw 54 engaging a locking dog 55 which works within a slot 56 in the bracket 50, the latching end 57 of said dog 55 being adapted for engagement in either of several keeper notches 58 formed in the periphery of the stationary hub 35 so that the rotatable hub 46 can be locked in adjusted position. The handle bar 53 is rotated in the sleeve 51 and the worm screw 54 thereon acts upon the locking dog 55 to advance or retract the same relative to the stationary hub 35 so as to bring the latch end 57 of said dog into or out of engagement therewith. When the dog 55 is disengaged from the stationary hub 35 by retracting the latch end 57 out of the keeper notches 58 the rotary hub 46 can be turned on the pivot bolt 45 by swinging the handle bar 53 thus shifting the trip horn 47 so that the side guard can be swung rearwardly to uncover the saw 11 and in event that it is desired to have the side guard retained in its rearwardly shifted position the handle bar 53 is manipulated so that the dog 55 will engage with the stationary hub 35 to lock the tripping horn 47 in its rearwardly shifted position.

Connected with the dog 55 is a guide pin 59 which works through a guide 60 carried upon the bracket 50 and surrounding this pin 59 is a coiled tension spring 61 which plays against said guide 60 and the dog 55 so as to hold the latter under tension when adjusted by turning the handle bar 53. By manipulating the handle bar 53 it will be clearly apparent that the side guard for the saw 11 can be manually shifted rearwardly relative to said saw and locked in said position or the said side guard can be locked against shifting movement when in normal position overhanging the periphery of the saw 11. However the side guard for the saw 11 in its suspended position overhanging the said saw 11 will be automatically shifted rearwardly when a piece of work is fed to the saw and being cut thereby as will be obvious by reason of the suspension of the side guard through the medium of the swinging couplers as hereinbefore described.

Formed in the inner face of the lower section 16 of the hanger is a vertical row of spaced depressions or notches 62 in any one of which is adapted to frictionally engage a latch lug 63 carried on one end of a bowed leaf spring 64 adjustably mounted through the medium of a bolt 65 and wing nut 66 upon the upper section 15 of the hanger and in this manner the strain upon the cable 28 is relieved when the lower section 16 has been adjusted relative to the upper section 15 of the hanger, the latch lug 63 being projected through a suitable opening formed in the upper section 15 of the hanger as is clearly shown in detail in Fig. 3 of the drawings.

A safety lock for the back guard 43 of the saw 11 is provided in the frame 10 and comprises an angle bracket 67 which is bolted or otherwise secured to the longitudinal part of the frame 10 rearwardly of the saw 11 and this bracket 67 has fixed thereon a keeper 68 in which is slidably fitted a locking pin 69, the keeper 68 being formed with a jaw 70 for accommodating the lower end of the back guard 43, which latter is provided with a hole for receiving the locking pin 69, the same being slidable transversely through the jaw 70 and is held under tension through the medium of a coiled spring 71 fitted within the keeper 68 and active upon said pin. The locking pin 69 is pivoted at 72 to a link 73, which is also pivoted at 74 to a crank 75 fixed to the inner end of an operating handle 76 journaled for rocking movement in the frame 10 so that the locking pin 69 can be manually released from engagement with the back guard 43 by manipulating the handle 76 at the front of the saw frame or structure, it being impossible to elevate the back guard 43 when the same is locked by the locking pin 69 so that there is no possibility of the accidental shifting of the back guard relative to the saw 11 as will be clearly apparent.

In Figs. 16 and 17 of the drawings the saw guard includes the side guard 77 and the back guard 78 which are supported and suspended in a manner as hereinbefore set forth, the guard 78 being preferably of the shape shown, while the guard 77 is constructed identically to the side guard hereinbefore described. These guards 77 and 78 are arranged relative to a rotatable saw 79 supported in a saw frame structure 80 for the handling of heavy timbers, the saw frame structure 80 being mounted upon a foundation, while the saw frame structure 10 hereinbefore described is of the bench type.

To raise and lower the side and back guards for the saws 11 and 79 it is necessary to manipulate the shaft 27 by the handle 28 so that the hanger including the sections 15 and 16 can be adjusted by the cable 28 wound upon the windlass 26, the section 16 being slidable in the section 15 of the hanger and normally the side and back guards are positioned relative to the saw as is clearly shown in Figs. 1, 4, 16 and 17 of the drawings.

From the foregoing it is thought that the construction and manner of operation of the saw guard will be clearly understood and therefore a more extended explanation has been omitted.

What is claimed is:

1. A saw guard of the character described, comprising a side guard adapted to overhang a saw, a back guard for said saw, means swingingly supporting the side guard, a hanger for both guards, and means for vertically adjusting the hanger.

2. A saw guard of the character described, comprising a side guard adapted to overhang a saw, a back guard for said saw, means swingingly supporting the side guard, a hanger for both guards, and means for vertically adjusting the hanger, and means for manually moving the side guard in a path receding from the saw.

3. A saw guard of the character described, comprising a side guard adapted to overhang a saw, a back guard for said saw, means swingingly supporting the side guard, a hanger for both guards, means for vertically adjusting the hanger, means for manually moving the side guard in a path receding from the saw, and means for locking the manually movable means in adjusted position.

4. A saw guard of the character described, comprising a side guard adapted to overhang a saw, a back guard for said saw, means swingingly supporting the side guard, a hanger for both guards, means for vertically adjusting the hanger, means for manually moving the side guard in a path receding from the saw, means for locking the manually movable means in adjusted position, and means for locking the back guard in lowered working position relative to the saw.

5. A saw guard of the character described, comprising a side guard adapted to overhang a saw, a back guard for said saw, means swingingly supporting the side guard, a hanger for both guards, means for vertically adjusting the hanger, means for manually moving the side guard in a path receding from the saw, means for locking the manually movable means in adjusted position, means for locking the back guard in lowered working position relative to the saw, and means for releasing the last named means.

6. A saw guard of the character described, comprising a side guard adapted to overhang a saw, a back guard for said saw, means swingingly supporting the side guard, a hanger for both guards, means for vertically adjusting the hanger, means for manually moving the side guard in a path receding from the saw, means for locking the manually movable means in adjusted position, means for locking the back guard in lowered working position relative to the saw, means for releasing the last named means, and interfitted stationary and slidable sections constituting said hanger.

7. A saw guard of the character described, comprising a side guard adapted to overhang a saw, a back guard for said saw, means swingingly supporting the side guard, a hanger for both guards, means for vertically adjusting the hanger, means for manually moving the side guard in a path receding from the saw, means for locking the manually movable means in adjusted position, means for locking the back guard in lowered working position relative to the saw, means for releasing the last named means, interfitted stationary and slidable sections constituting said hanger, and a windlass carried by the stationary section, a guide pulley on said stationary section, a lifting rod connected to the movable section, and a winding and unwinding cable connected with the windlass and having one end trained over the pulley and connected with said rod, the other end of the cable being also connected with said rod.

8. A saw guard of the character described, comprising a side guard adapted to overhang a saw, a back guard for said saw, means swingingly supporting the side guard, a hanger for both guards, means for vertically adjusting the hanger, means for manually moving the side guard in a path receding from the saw, means for locking the manually movable means in adjusted position, means for locking the back guard in lowered working position relative to the saw, means for releasing the last named means, interfitted stationary and slidable sections constituting said hanger, and a windlass carried by the stationary section, a guide pulley on said stationary section, a lifting rod connected to the movable section, and a winding and unwinding cable connected with the windlass and having one end trained over the pulley and connected with said rod, the other end of the cable being also connected with said rod, and means carried by the stationary section and engageable with the movable section to hold the same in adjusted position relative to the stationary section.

In testimony whereof, I affix my signature hereto.

HOMER J. TRAVER.